US012213545B2

(12) United States Patent
Knox

(10) Patent No.: US 12,213,545 B2
(45) Date of Patent: Feb. 4, 2025

(54) FLASHLIGHT ASSEMBLY HAVING A PROXIMAL PHALANGES PORTION, METACARPALS PORTION AND CARPALS PORTION

(71) Applicant: Phillip Knox, Stone Mountain, GA (US)

(72) Inventor: Phillip Knox, Stone Mountain, GA (US)

(*) Notice: Subject to any disclaimer, the term of this patent is extended or adjusted under 35 U.S.C. 154(b) by 0 days.

(21) Appl. No.: 18/599,194

(22) Filed: Mar. 7, 2024

(65) Prior Publication Data

US 2024/0341380 A1 Oct. 17, 2024

Related U.S. Application Data

(60) Provisional application No. 63/450,448, filed on Mar. 7, 2023.

(51) Int. Cl.

| | |
|---|---|
| ***A41D 19/00*** | (2006.01) |
| ***F21V 23/04*** | (2006.01) |
| *F21V 33/00* | (2006.01) |
| *F21Y 113/20* | (2016.01) |

(52) U.S. Cl.
CPC ..... *A41D 19/0037* (2013.01); *A41D 19/0013* (2013.01); *F21V 23/0414* (2013.01); *F21V 33/0008* (2013.01); *F21Y 2113/20* (2016.08)

(58) Field of Classification Search
CPC ............ A41D 19/0037; A41D 19/0157; F21V 33/0008
See application file for complete search history.

(56) References Cited

U.S. PATENT DOCUMENTS

| | | | | |
|---|---|---|---|---|
| 5,345,368 A * | 9/1994 | Huff | F21V 21/0832 2/160 |
| D604,778 S * | 11/2009 | Chan | D2/621 |
| 8,523,377 B1 * | 9/2013 | York | F21V 21/08 362/570 |

* cited by examiner

*Primary Examiner* — Robert J May
(74) *Attorney, Agent, or Firm* — Incorporating Innovation LLC; Charlena Thorpe, Esq.

(57) ABSTRACT

Implementations of a flashlight assembly having a padded article of manufacturer configured to secure a lighting to the back of a wearer's hand and to secure a switch to activate the light adjacent a user's index figure with at least a portion of the wearer's hand and fingers exposed is provided.

13 Claims, 7 Drawing Sheets

FLASHLIGHT ASSEMBLY HAVING A PROXIMAL PHALANGES PORTION, METACARPALS PORTION AND CARPALS PORTION

CROSS REFERENCE TO RELATED APPLICATION

This application claims the benefit of U.S. Patent Application Ser. No. 63/450,448, which was filed on Mar. 7, 2023, and is incorporated herein by reference in its entirety.

TECHNICAL FIELD

This disclosure relates to implementations of a flashlight assembly.

BACKGROUND

Originally, police officers were trained to hold a light in one hand and then hold a gun in the opposite hand. This was cumbersome in the event of an emergency. Therefore, tactical lights were mounted on the front of guns for hands-free use of the flashlights. Tactical lights mounted on guns have their own set of problems in that to use the flashlight, the gun has to be out in non-emergency situations.

DETAILED DESCRIPTION

Figure 1:
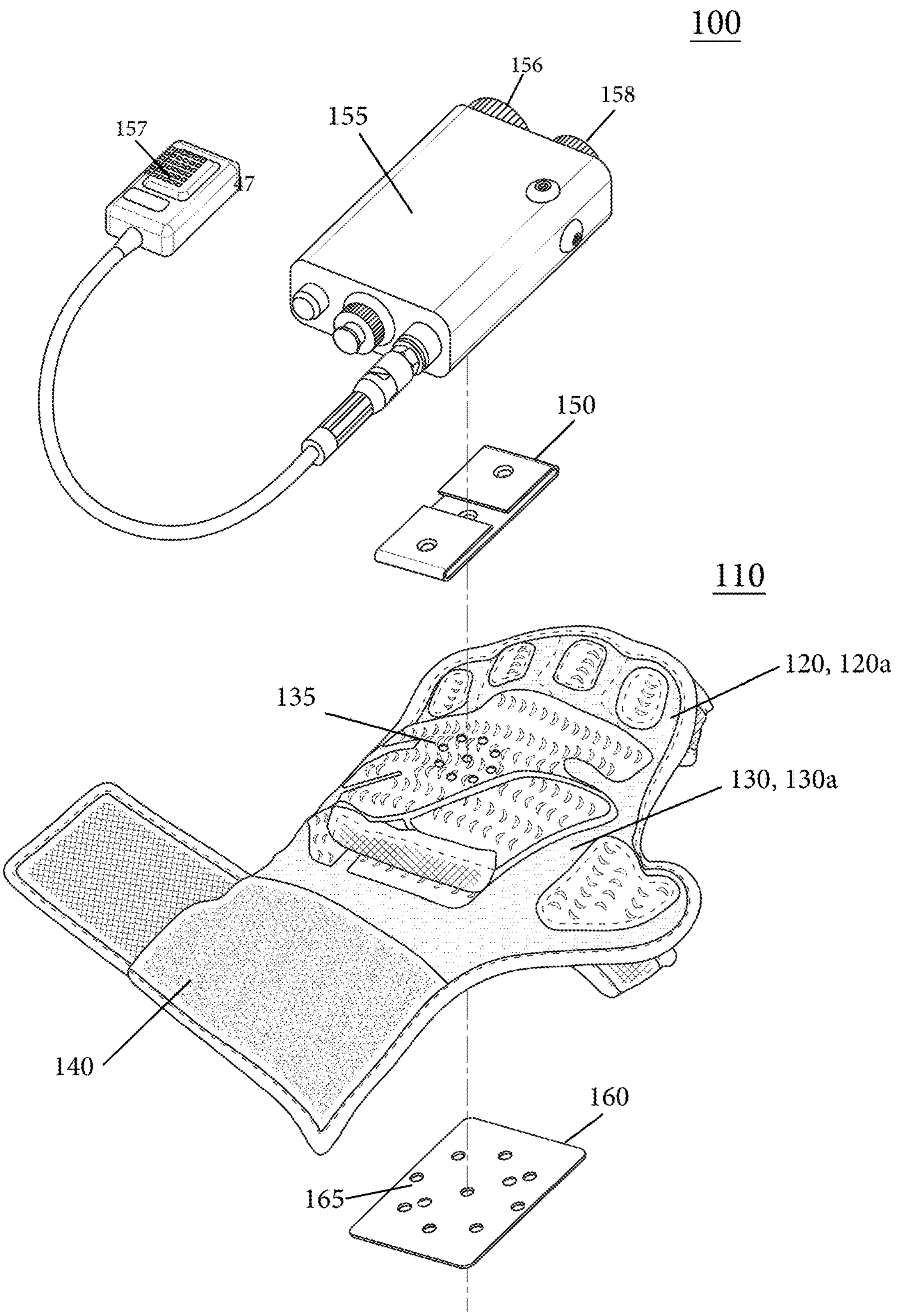
FIGS. 1-9 illustrate various views of implementations of example flashlight assemblies according to the present disclosure.
Figure 2:
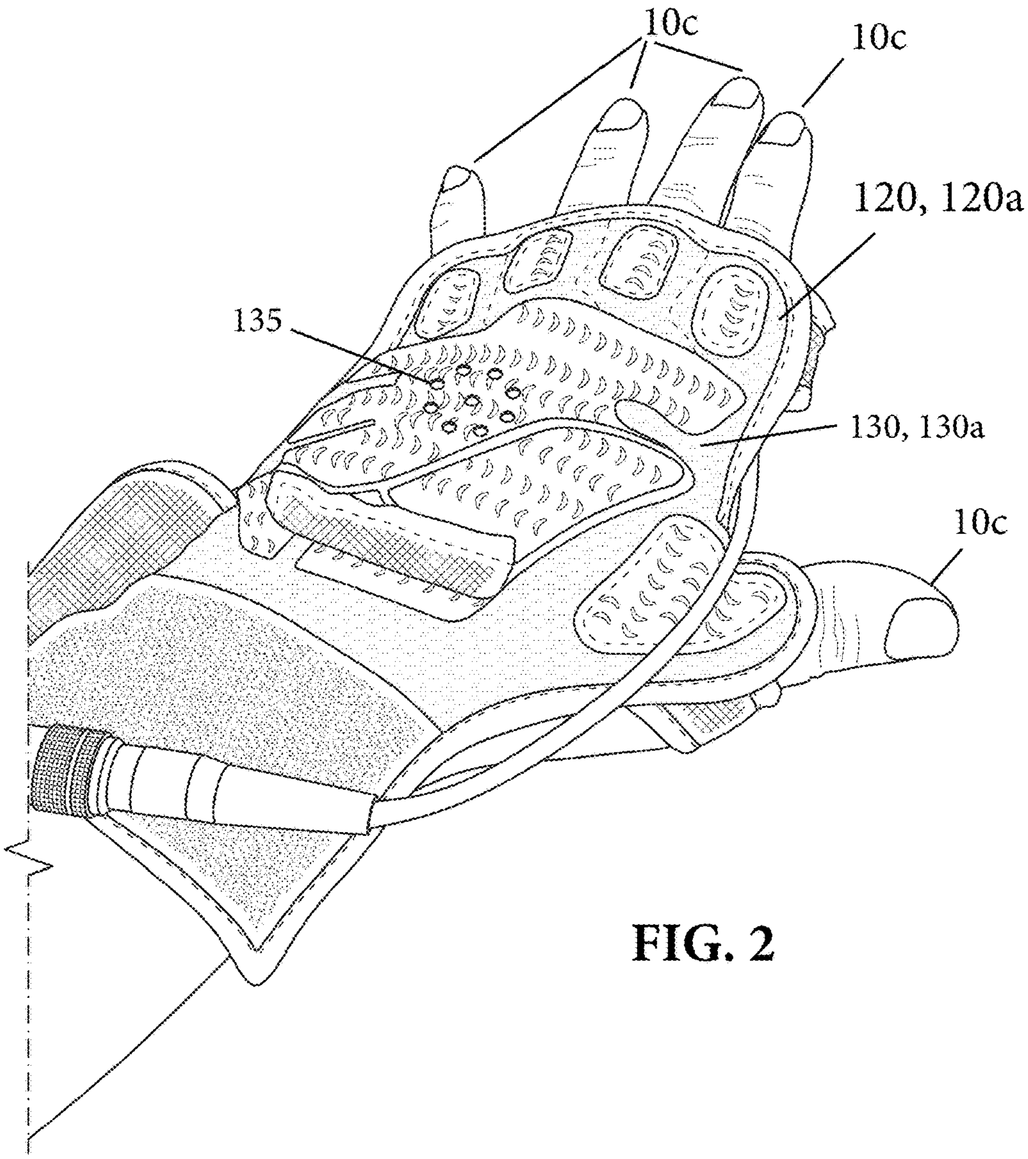
Figure 3:
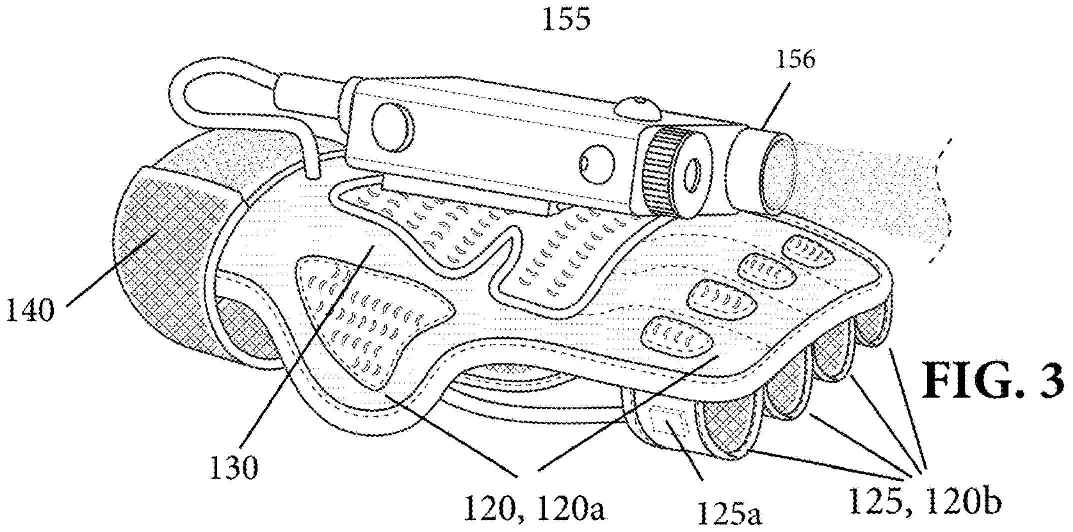

Implementations of a flashlight assembly are provided. The flashlight assembly of the present disclosure can be used by police officers, service personnel, security guards, pilots, or anyone desiring to use a light hands-free.

Tactical lights are flashlights typically used in conjunction with a firearm to aid low-light target identification. In some implementations, the flashlight assembly comprises a tactical light. Accordingly, in some implementations, the light is of sufficient intensity to aid a police officer, military personnel, or others in the performance of their duties. In some implementations, the light has at least 150 lumens. In some implementations, the light has at least 600 lumens. In some implementations, the light has between 150 and 600 lumens. In some implementations, the light has less than 150 lumens.

In some implementations, the flashlight assembly of the present disclosure allows a wearer to have both hands functional or available.

In some implementations of the flashlight assembly of the present disclosure, a portion of the palm and fingers are open thereby allowing the wearer to touch, feel, and/or grip objects as if not wearing anything.

In some implementations of the flashlight assembly of the present disclosure, a light can be mounted ergonomically on the back of a wearer's hand (i.e., the dorsal side).

In some implementations of the flashlight assembly of the present disclosure, the light is adjustable to the wearer (e.g., based on the shooting position or hands of the wearer). In some implementations, the light may be adjustable 360 degrees.

In some implementations, the flashlight assembly of the present disclosure is configured such that a switch that activates the light is positioned so that the same hand holding the light with the aid of flashlight assembly can operate the switch to activate the light.

In some implementations, the flashlight assembly of the present disclosure comprises a laser.

In some implementations, the lighting assembly housing the light is designed to disperse the energy if the housing is impacted. In some implementations, the housing is rectangular.

In some implementations, the housing has flat surfaces.

In some implementations, the housing does not have any round surfaces.

In some implementations, the housing has a width less than 2 inches. In some implementations, the housing has a width greater than 3 inches. In some implementations, the housing has a length less than 3 inches. In some implementations, the housing has a length greater than 3 inches. In some implementations, the housing has a height less than 1 inch. In some implementations, the housing has a height greater than 1 inch.

In some implementations, the flashlight assembly of the present disclosure comprises layers of protection to protect the hand of the wearer. As discussed below, the flashlight assembly comprises an article of manufacture including a flap, an inner bracket, and an outer bracket. The layers help to protect a wearer's hand. In some implementations, the article of manufacture is made from a breathable material and foam padding. In some implementations, the article of manufacture comprises any suitable padding.

In some implementations, the flashlight assembly of the present disclosure comprises a wristband that provides further protection to the wearer engaged in physical activity.

As shown in the figures, in some implementations, the flashlight assembly 100 comprises an article of manufacture 110 comprising a proximal phalanges portion 120 having an outer side 120*a* and an inner side 120*b* opposite the outer side.

In some implementations, the proximal phalanges portion 120 is sized to extend widthwise across the four proximal phalanges 10*a* of a wearer's fingers and thumb.

In some implementations, the inner side 120*b* of the proximal phalanges portion 120 comprises five elongated proximal phalange pockets 125 placed across the width of the proximal phalanges portion wherein each of the elongated proximal phalange pockets have an opening extending therethrough such that a wearer can place the wearer's four fingers and thumbs through respective elongated proximal phalange pockets. As discussed further below and shown in the figures, in some implementations, the elongated proximal phalange pockets are open on both ends.

In some implementations, the proximal phalanges portion 120 is sized such that at least the distal ends of the distal phalanges 10*b* of a wearer's fingers and thumb are not covered by the article of manufacture when the wearer places the wearer's four fingers and thumbs through respective elongated proximal phalange pockets.

In some implementations, the article of manufacture 110 comprises a metacarpals portion 130 having an outer side 130*a* and an inner side 130*b* opposite the outer side wherein the metacarpals portion 130 extends from the proximal phalanges portion 120 and is sized and configured to cover the dorsal side of the hand corresponding to the location of the metacarpals 10*c* in the wearer's hand and wherein the metacarpals portion 130 comprises a group of openings 135 extending from the outer side 130*a* to the inner side 130*b* of the metacarpals portion 130.

In some implementations, the article of manufacture 110 comprises a carpals portion 140 extending from the metacarpals portion 130 and comprising an elongated piece of material configured to wrap around the wrist of the wearer. In some implementations, the strap is secured using Velcro.

In some implementations, the flashlight assembly 100 comprises an outer mounting bracket 150 positioned on top of the group of openings on the outer side 130*b* of the metacarpals portion 130 of the article of manufacture.

In some implementations, the outer mounting bracket 150 is configured to attach to a lighting assembly and configured to change positions thereby changing positions of a lighting assembly attached to the outer mounting bracket.

In some implementations, the flashlight assembly 100 comprises an inner mounting bracket 160 positioned on the inner side 130*b* of the metacarpals portion 130 of the article of manufacture.

In some implementations, the inner mounting bracket 160 comprises a group of openings 165 extending through the inner mounting bracket 160 wherein the group of openings 165 of the inner mounting bracket 160 are in the same configuration as the group of openings 135 of the metacarpals portion 130 of the article of manufacture such that when the inner mounting bracket is positioned on the inner side of the metacarpals portion of the article of manufacture, the group of openings 165 of the inner mounting bracket align with the group of openings 135 of the metacarpals portion of the article of manufacture.

Figure 4:
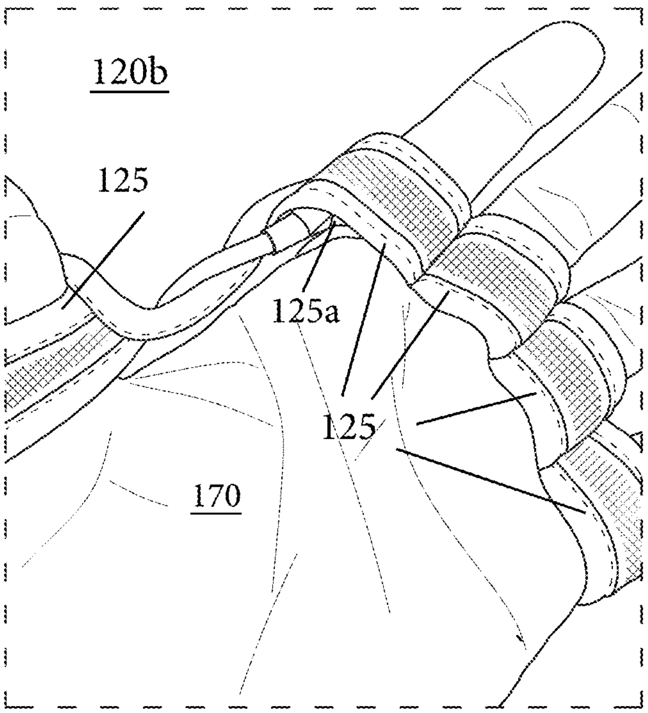
Figure 5:
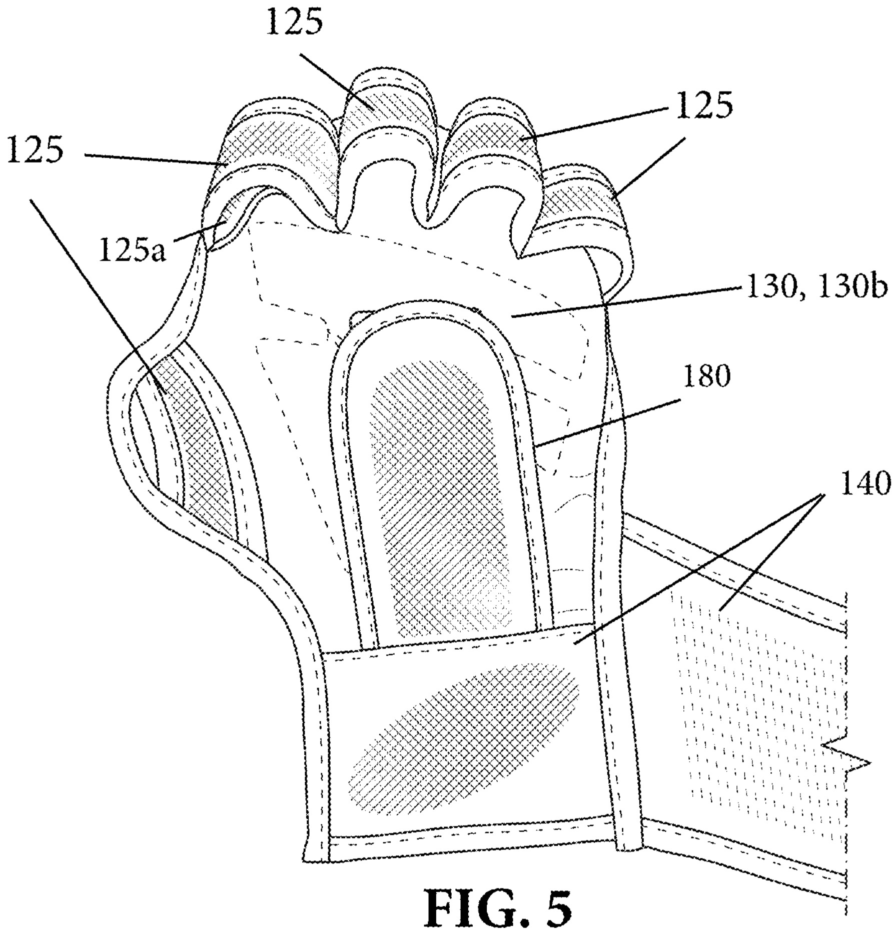
Figure 6:
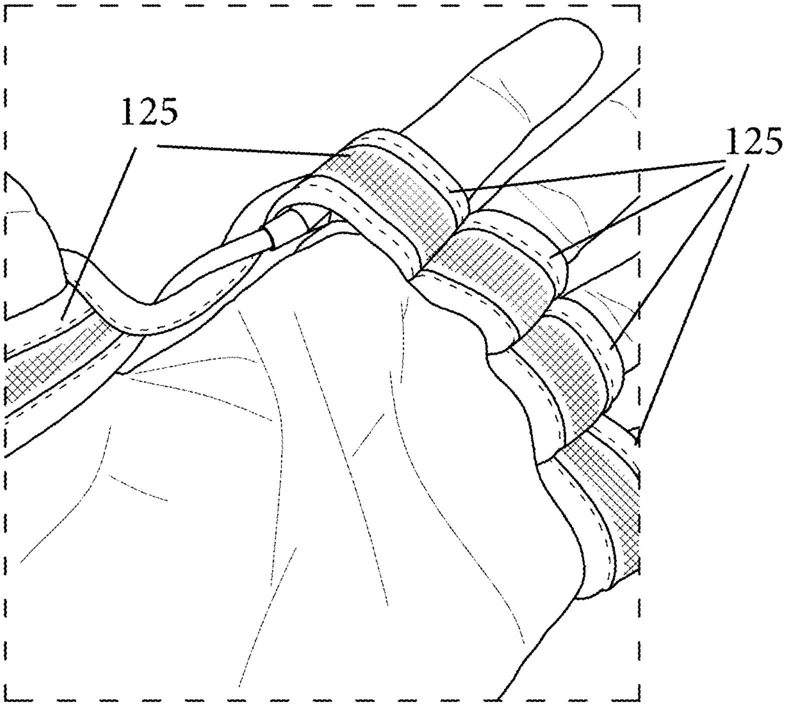
Figure 7:
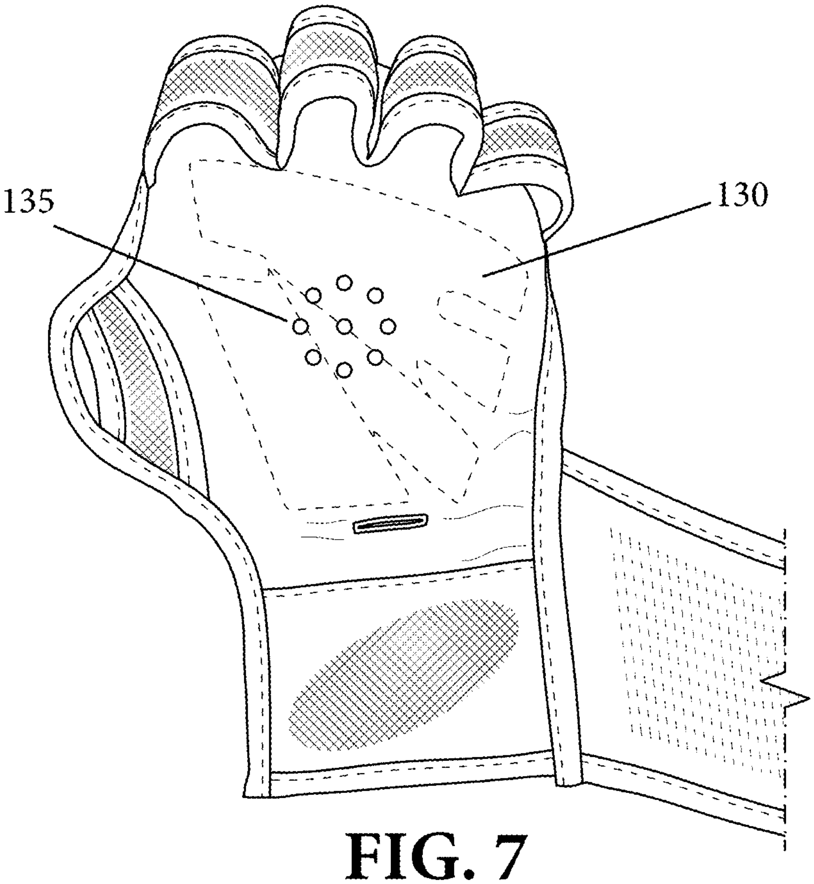
Figure 8:
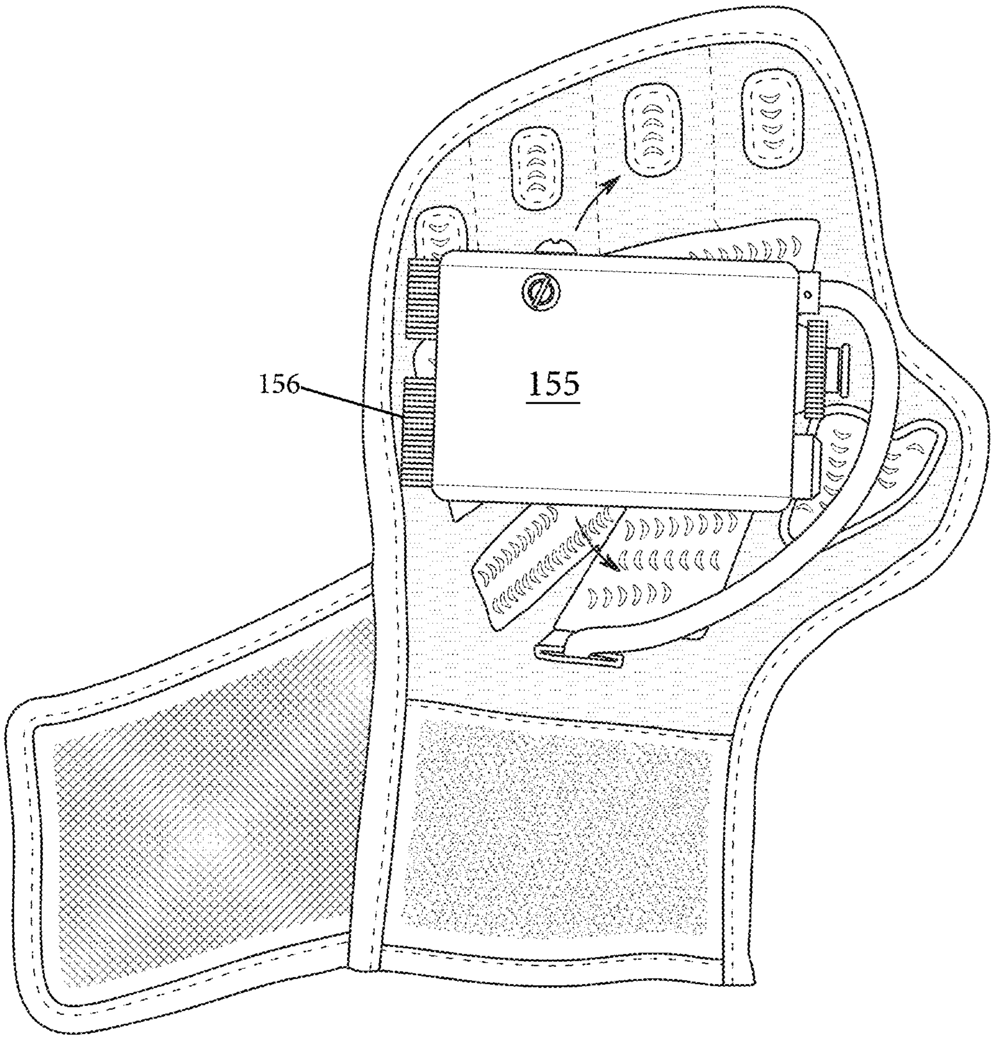
Figure 9:
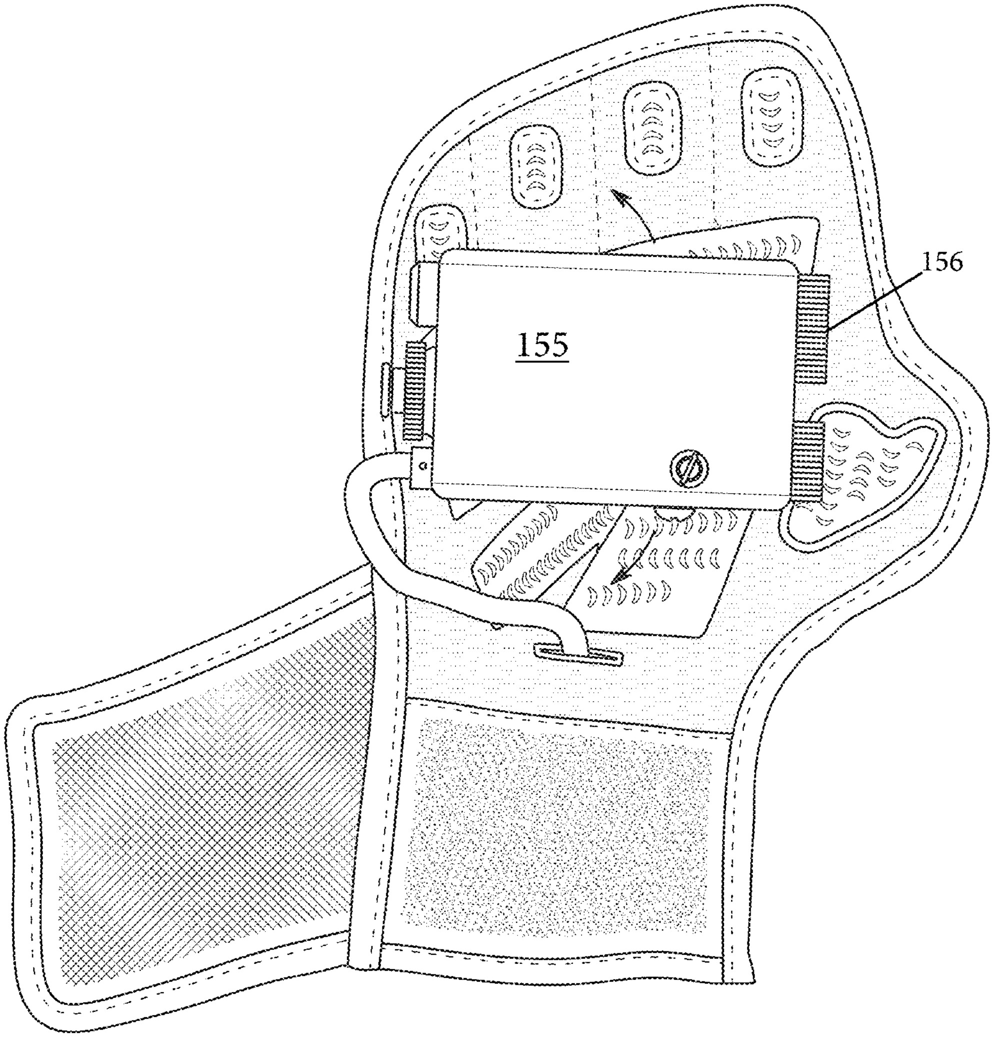
Figure 10:
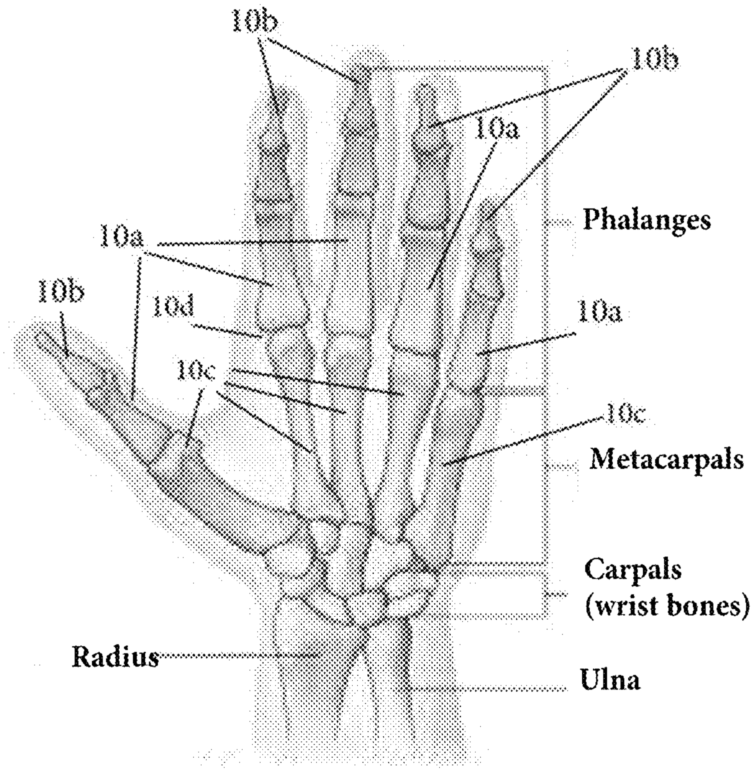
FIG. 10 illustrates an example anatomy of an example hand.

As shown in FIGS. 4 and 6, in some implementations, the article of manufacturer 110 is configured to expose the palm 170 of the wearer's hand or a portion thereof when the article of manufacturer is worn. FIG. 4 illustrates the article of manufacturer illustrated in FIG. 5 when on a wearer's hand. FIG. 6 illustrates the article of manufacturer illustrated in FIG. 7 when on a wearer's hand.

In some implementations, the outer mounting bracket and inner mounting bracket are rigid. In some implementations, the outer mounting bracket and inner mounting bracket are made from steel. In some implementations, the outer mounting bracket and inner mounting bracket are made from any suitable material.

In some implementations, the elongated proximal phalange pocket that an index finger would be inserted when the flashlight assembly is worn comprises an internal pocket 125*a* for housing a switch 157 configured to activate a light 156 in the lighting assembly to be attached to the outer light mounting bracket 150.

In some implementations, the pocket 125*a* is positioned such that the switch can be pressed with the wearer's thumb adjacent the index finger.

In some implementations, the article of manufacture 110 further comprises a flap 180. where one end of the flap is attached to the inner side of the article of manufacture and an opposite end of the flap is not attached to the article of manufacture. In some implementations, the flap 180 is sized and positioned to cover and uncover the inner mounting bracket based on the positioning of the flap.

In some implementations, the flashlight assembly 100 comprises a lighting assembly having a light housed in a rectangular housing 155 and a switch 157 configured to activate the light. In some implementations, the housing is any suitable shape.

In some implementations, the top surface of the housing is flat. In some implementations, the bottom surface of the housing is flat. In some implementations, a surface of the housing is round.

In some implementations, the housing is attached to the outer mounting bracket 150.

In some implementations, the switch 157 is housed in the internal pocket 125*a* of the elongated proximal phalange pocket that an index finger would be inserted when the flashlight assembly is worn.

In some implementations, the housing, outer mounting bracket, and inner mounting bracket are sized and positioned so as not to interfere with the normal movement of the wearer's wrist when the flashlight assembly is worn.

In some implementations, the front of the housing where the light exits the housing is positioned adjacent the metacarpophalangeal joints 10*d* (knuckles) so that the wearer's hand does not interfere with the light beam from the housing when the flashlight assembly is worn and the light assembly is activated.

In some implementations, a laser 158 is housed in the housing and the switch 157 is configured to activate the laser.

In some implementations, the switch is configured to wirelessly activate the light 156 and laser 158.

The figures, including photographs and drawings, comprised herewith may represent one or more implementations of the present disclosure.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A flashlight assembly comprising:

an article of manufacture comprising:

a proximal phalanges portion having an outer side and an inner side opposite the outer side wherein:

the proximal phalanges portion is sized to extend widthwise across the four proximal phalanges of a wearer's fingers and thumb;

the inner side of the proximal phalanges portion comprises five elongated proximal phalange pockets placed across the width of the proximal phalanges portion wherein each of the elongated proximal phalange pockets have an opening extending therethrough such that a wearer can place the wearer's four fingers and thumbs through respective elongated proximal phalange pockets; and the proximal phalanges portion is sized such that at least the distal ends of the distal phalanges of a wearer's fingers and thumb are not covered by the article of manufacture when the wearer places the wearer's four fingers and thumbs through respective elongated proximal phalange pockets, a metacarpals portion having an outer side and an inner side opposite the outer side wherein the metacarpals portion extends from the proximal phalanges portion and is sized and configured to cover the dorsal side of the hand corresponding to the location of the metacarpals in the wearer's hand and wherein the metacarpals portion comprises a group of openings extending from the outer side to the inner side of the metacarpals portion; and a carpals portion extending from the metacarpals portion and comprising an elongated piece of material configured to wrap around the wrist of the wearer;

an outer mounting bracket positioned on top of the group of openings on the outer side of the metacarpals portion of the article of manufacture wherein the outer mounting bracket is configured to attach to a lighting assembly and configured to change positions thereby changing positions of a lighting assembly attached to the outer mounting bracket; and an inner mounting bracket positioned on the inner side of the metacarpals portion of the article of manufacture wherein the inner mounting bracket comprises a group of openings extending through the inner mounting bracket wherein the group of openings of the inner mounting bracket are in the same configuration as the group of openings of the metacarpals portion of the article of manufacture such that when the inner mounting bracket is positioned on the inner side of the metacarpals portion of the article of manufacture, the group of openings of the inner mounting bracket align with the group of openings of the metacarpals portion of the article of manufacture, wherein the article of manufacturer is configured to expose the palm of the wearer's hand when the article of manufacturer is worn.

2. The flashlight assembly of claim 1 wherein the outer mounting bracket and inner mounting bracket are rigid.

3. The flashlight assembly of claim 2 wherein the outer mounting bracket and inner mounting bracket are made from steel.

4. The flashlight assembly of claim 1 wherein the elongated proximal phalange pocket that an index finger would be inserted when the flashlight assembly is worn comprises an internal pocket for housing a switch configured to activate a light in the lighting assembly to be attached to the outer light mounting bracket wherein the pocket is positioned such that the switch can be pressed with the wearer's thumb adjacent the index finger.

5. The flashlight assembly of claim 1 wherein the article of manufacture further comprises a flap where one end of the flap is attached to the inner side of the article of manufacture and an opposite end of the flap is not attached to the article of manufacture and wherein the flap is sized and positioned to cover and uncover the inner mounting bracket based on the positioning of the flap.

6. The flashlight assembly of claim 1 further comprising a lighting assembly having a light housed in a rectangular housing and a switch configured to activate the light wherein the top surface of the housing is flat, the housing is attached to the outer mounting bracket, and the switch is housed in the internal pocket of the elongated proximal phalange pocket that an index finger would be inserted when the flashlight assembly is worn.

7. The flashlight assembly of claim 6 wherein the housing, outer mounting bracket, and inner mounting bracket are sized and positioned so as not to interfere with the normal movement of the wearer's wrist when the flashlight assembly is worn.

8. The flashlight assembly of claim 7 wherein the front of the housing where the light exits the housing is positioned adjacent the metacarpophalangeal joints (knuckles) so that the wearer's hand does not interfere with the light beam from the housing when the flashlight assembly is worn and the light assembly is activated.

9. The flashlight assembly of claim 6 wherein the housing is less than 3 inches in length, less than 2 inches in width, and less than 1 inch in height.

10. The flashlight assembly of claim 6 further comprising a laser housed in the housing wherein the switch is configured to activate the laser.

11. The flashlight assembly of claim 6 wherein the light has at least 150 lumens.

12. An article of manufacture comprising:

a proximal phalanges portion having an outer side and an inner side opposite the outer side wherein:

the proximal phalanges portion is sized to extend widthwise across the four proximal phalanges of a wearer's fingers and thumb;

the inner side of the proximal phalanges portion comprises five elongated proximal phalange pockets placed across the width of the proximal phalanges portion wherein each of the elongated proximal phalange pockets have an opening extending therethrough such that a wearer can place the wearer's four fingers and thumbs through respective elongated proximal phalange pockets and wherein the elongated proximal phalange pocket that an index finger would be inserted when the flashlight assembly is worn comprises an internal pocket for housing a switch configured to activate a light wherein the pocket is positioned such that the switch can be pressed with the wearer's thumb adjacent the index finger; and the proximal phalanges portion is sized such that at least the distal ends of the distal phalanges of a wearer's fingers and thumb are not covered by the article of manufacture when the wearer places the wearer's four fingers and thumbs through respective elongated proximal phalange pockets, a metacarpals portion having an outer side and an inner side opposite the outer side wherein the metacarpals portion extends from the proximal phalanges portion and is sized and configured to cover the dorsal side of the hand corresponding to the location of the metacarpals in the wearer's hand and wherein the metacarpals portion comprises a group of openings extending from the outer side to the inner side of the metacarpals portion;

a carpals portion extending from the metacarpals portion and comprising an elongated piece of material configured to wrap around the wrist of the wearer; and a flap where one end of the flap is attached to the inner side of the article of manufacture and an opposite end of the flap is not attached to the article of manufacture and wherein the flap is sized and positioned to cover and uncover the group of openings extending to the inner side of the metacarpals portion based on the positioning of the flap, wherein the article of manufacturer is configured to expose the palm of the wearer's hand when the article of manufacturer is worn.

13. A flashlight assembly comprising:

a lighting assembly having a tactical light and a laser housed in a rectangular housing and a switch configured to activate the light and laser wherein the top surface of the housing is flat and the housing is less than 3 inches in length, less than 2 inches in width, and less than 1 inch in height;

an article of manufacture comprising:

a proximal phalanges portion having an outer side and an inner side opposite the outer side wherein:

the proximal phalanges portion is sized to extend widthwise across the four proximal phalanges of a wearer's fingers and thumb;

the inner side of the proximal phalanges portion comprises five elongated proximal phalange pockets placed across the width of the proximal phalanges portion wherein each of the elongated proximal phalange pockets have an opening extending therethrough such that a wearer can place the wearer's four fingers and thumbs through a respective elongated proximal phalange pocket, wherein the elongated proximal phalange pocket that an index finger would be inserted when the flashlight assembly is worn comprises an internal pocket housing the switch, and wherein the internal pocket is positioned such that the switch can be pressed with the wearer's thumb adjacent the index finger; and the proximal phalanges portion is sized such that at least the distal ends of the distal phalanges of a wearer's fingers and thumb are not covered by the article of manufacture when the wearer places the wearer's four fingers and thumbs through respective elongated proximal phalange pockets, a metacarpals portion having an outer side and an inner side opposite the outer side wherein the metacarpals portion extends from the proximal phalanges portion and is sized and configured to cover the dorsal side of the hand corresponding to the location of the metacarpals in the wearer's hand and wherein the metacarpals portion comprises a group of openings extending from the outer side to the inner side of the metacarpals portion; and a carpals portion extending from the proximal phalanges portion and comprising an elongated piece of material configured to wrap around the wrist of the wearer;

an outer mounting bracket positioned on top of the group of openings on the outer side of the metacarpals portion of the article of manufacture wherein the outer mounting bracket is attached to the housing of the lighting assembly and configured to change positions thereby changing positions of the housing attached to the outer mounting bracket;

an inner mounting bracket positioned on the inner side of the metacarpals portion of the article of manufacture wherein the inner mounting bracket comprises a group of openings extending through the inner mounting bracket wherein the group of openings of the inner mounting bracket are in the same configuration as the group of openings of the metacarpals portion of the article of manufacture such that the group of openings of the inner mounting bracket are aligned with the group of openings of the metacarpals portion of the article of manufacture, wherein the outer mounting bracket and inner mounting bracket are made from steel, wherein the article of manufacturer further comprises a flap where one end of the flap is attached to the inner side of the article of manufacture and an opposite end of the flap is not attached to the article of manufacture and wherein the flap is sized and positioned to cover and uncover the inner mounting bracket based on the positioning of the flap; and wherein the article of manufacturer is configured to expose the palm of the wearer's hand when the article of manufacturer is worn.

* * * * *